April 14, 1942.  G. C. HAMILTON  2,279,820
PLYWOOD VESSEL
Filed Sept. 24, 1937  3 Sheets-Sheet 1
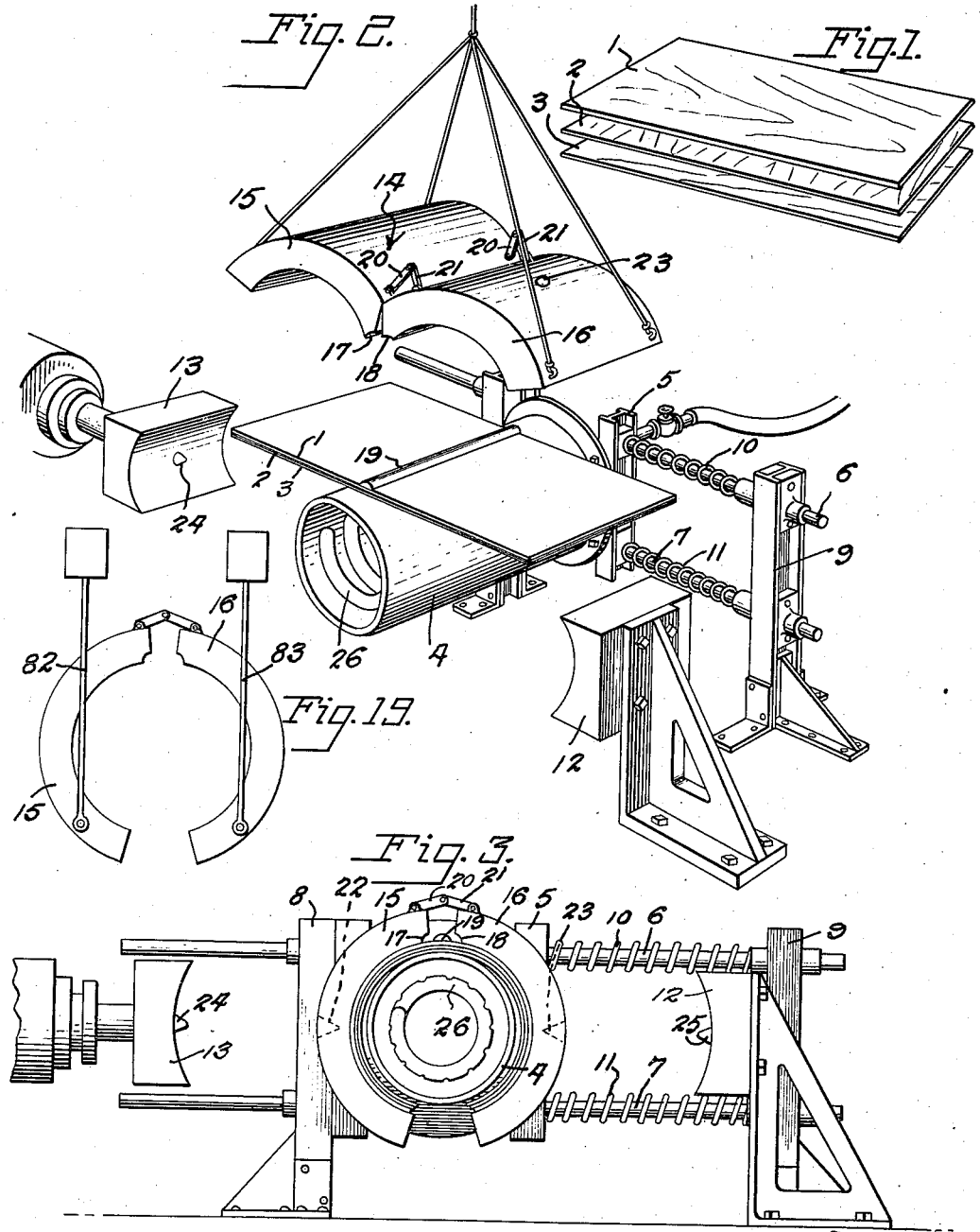
Inventor
George C. Hamilton
By Mason Fenwick & Lawrence
Attorneys April 14, 1942. G. C. HAMILTON 2,279,820
PLYWOOD VESSEL
Filed Sept. 24, 1937 3 Sheets-Sheet 2
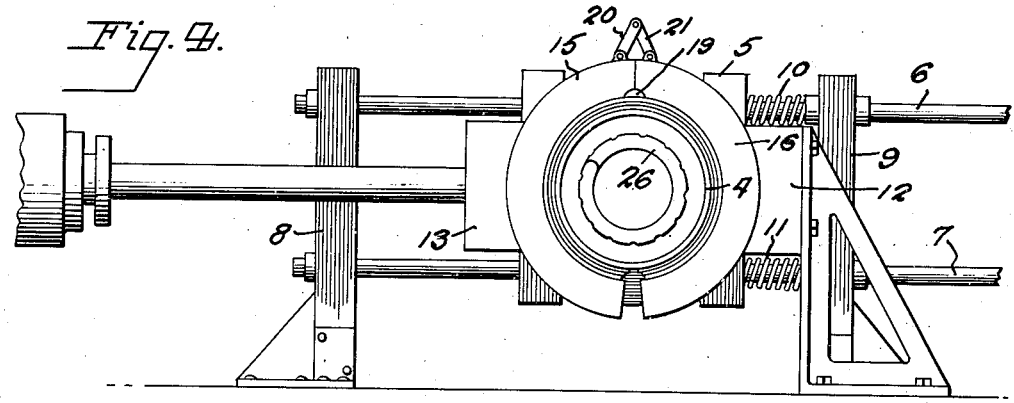
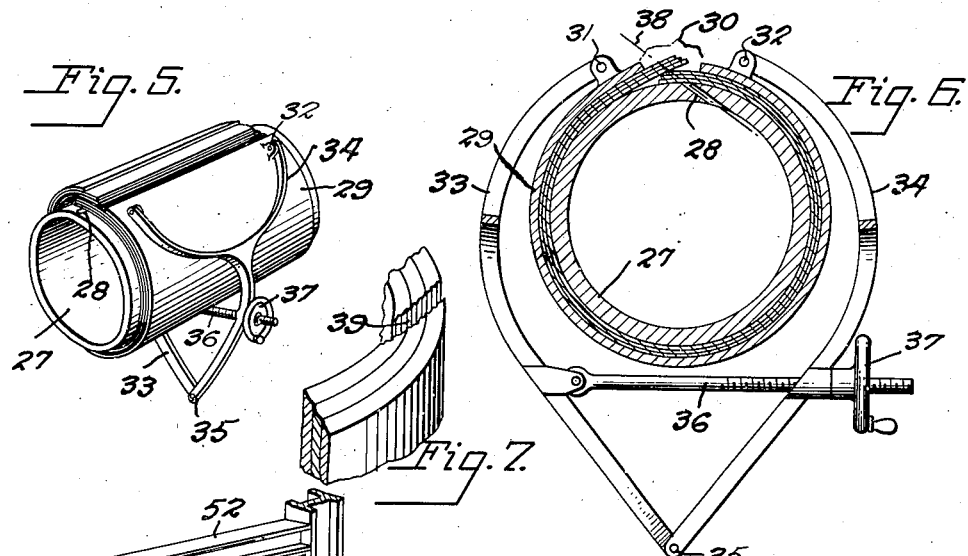
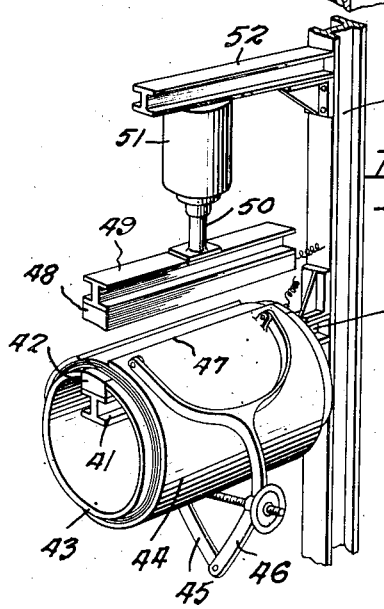
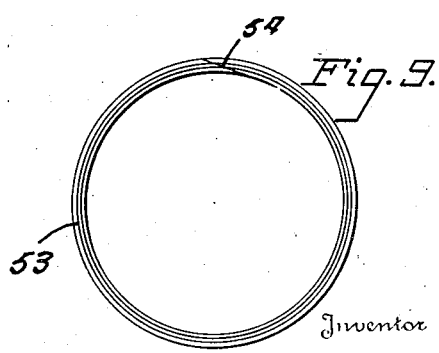
Inventor
George C. Hamilton
By Mason Fenwick & Lawrence
Attorneys

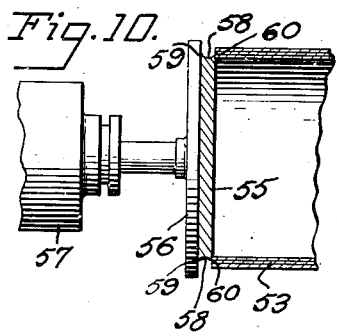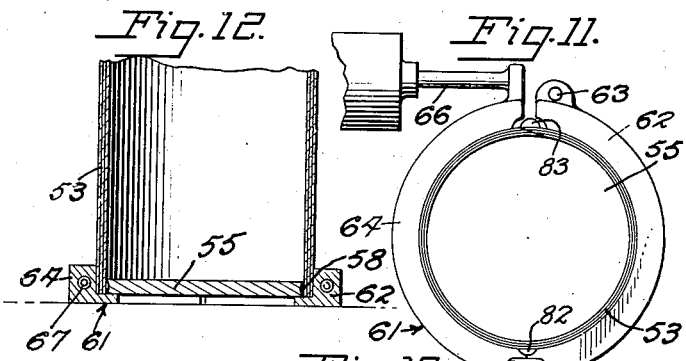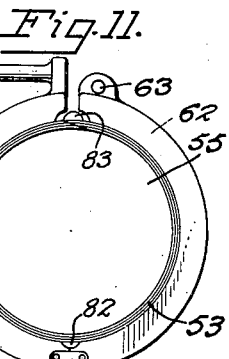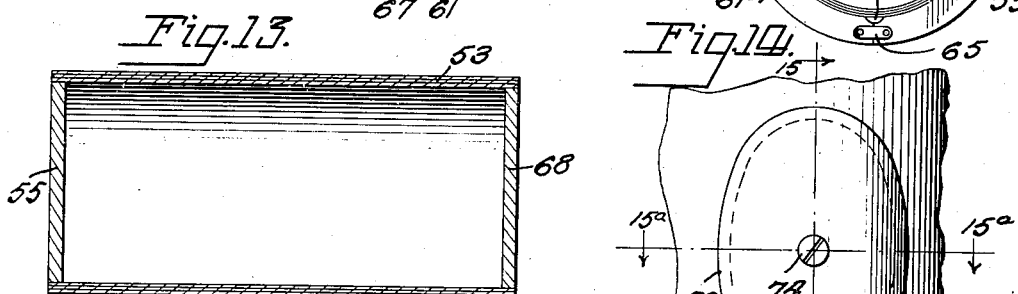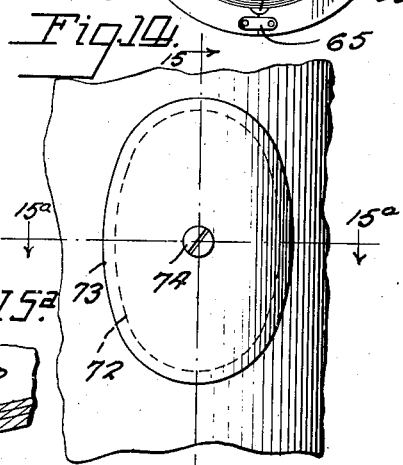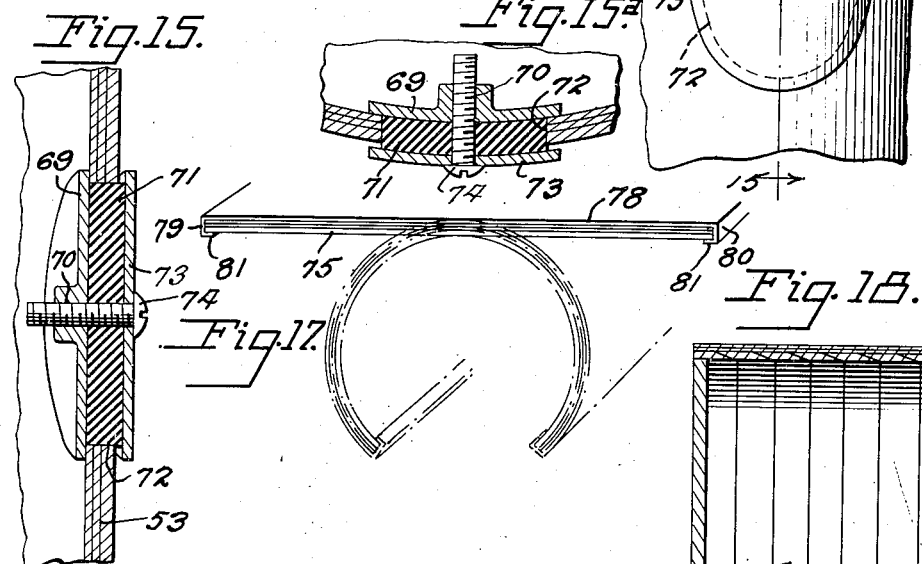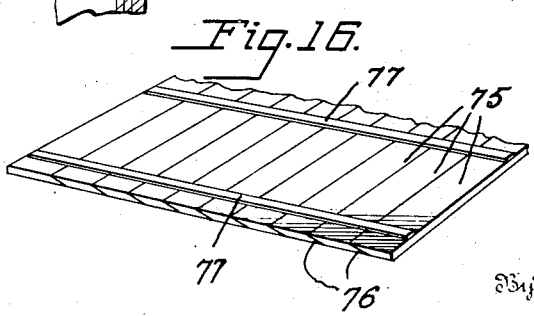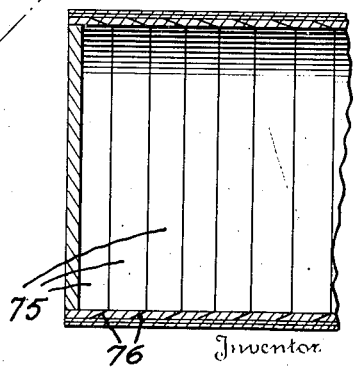

Patented Apr. 14, 1942

2,279,820

UNITED STATES PATENT OFFICE 2,279,820

PLYWOOD VESSEL

George C. Hamilton, McComb, Miss.

Application September 24, 1937, Serial No. 165,591

3 Claims. (Cl. 144—309)

This invention relates to laminated wooden vessels such as conduits, barrels, etc. The general object of the invention is to manufacture strong and durable vessels of a small plurality of plies of wood at least some of which are of such thickness as to resist bending, so that they must be forced into the shape of a vessel in the course of its manufacture.

The invention is to be distinguished from those manufactures which utilize veneers of such thinness that they can be wound into a laminated structure with about the same facility as though they were of papers. The object of the present invention is to assure strength in the article through preservation of the grain strength which is inherent in a relative thick sheet of wood, but which becomes practically nil where the wood is sliced so thin as to have practically no resistance to bending.

It is obvious that where a plurality of plies of wood are employed whose repose shape is planiform and which individually resist being bent away from this planiform shape, the aggregate thickness of said plies will oppose so much resistance to being bent if cemented together while in planiform relation, that if such plywood construction is bent around a mandrel into a cylindrical shape and jointed, the joint will be subjected to the enormous reactive force of the plywood structure attempting to unbend; and the glue line between the several plies will also be under a severe shearing strain since the contiguous plies at said glue lines are either under a compressive or a tensile stress according to whether the glue lines are near the inner or outer wall of the vessel.

One of the objects of the present invention therefore is to avoid insofar as possible the concentration of this enormous rending stress at the joint and also to relieve the glue lines of any shearing stress. This is accomplished by having the several plies of wood free and uncemented relative to one another at the time they are bent into the shape of a vessel so that they may move relatively to one another in a circumferential direction as they are compressed or elongated in the act of bending.

The invention further contemplates that the contiguous surfaces of the plies shall be coated or otherwise prepared with a thermosetting binder such as Bakelite which while the plies are held in bent relation and free from any stresses incident to their mutual association shall be instantaneously fused through pressure and suitable high temperature to bond the plies throughout their contacting surfaces. The uniting of the plies will give the resulting shell a repose shape which is substantially cylindrical and which will therefore exert practically no opening stress at the joint, said cylindrical repose position having been acquired by the cementing together of the plies while each was in its own independent bent position.

Another object of the invention is to construct a plywood vessel of wooden plies of the character described, in which the outer ply at least has the grain extending circumferentially of the vessel whereby said outside ply functions as a continuous reinforcing hoop.

Still another object of the invention is to provide a plywood vessel made of plies having the character described, adapted to contain liquids, in which the inner ply runs circumferentially so that the seepage paths which follow the grain will not extend lengthwise of the vessel between its side wall and its head.

A further object of the invention is to provide a plywood vessel made of wood plies, certain of which at least have a thickness of the order above defined having a scarf joint in the side wall, the faces of which are united by means of a thermosetting waterproof cement.

Still another object of the invention is to provide a vessel of the class described having a head or heads inserted with a forced fit into the peripheral end or ends of the side wall structure.

A further and more specific object of the invention is the provision of a spirits ageing or "bourbon" barrel, made of plywood as described, the inner ply of which is of quarter sawed white oak.

A further object of the invention relates to novel bung construction particularly adapted to the plywood barrels of the present invention and to retain pressure therein.

Another object of the invention is the provision of apparatus for carrying out the manufacture of plywood vessels of the class above described.

Inasmuch as the quarter sawed white oak laminations of the spirits ageing barrel is necessarily of greater thickness than the usual thickness of the plies used in the construction of other plywood vessels contemplated within the present invention, and since the surface of quarter sawed white oak cannot be put under such tensile stress as would take place in the act of bending it without the surface of the grain rupturing and raising splinters upon the tensioned surface, the invention contemplates the provision of a flexible metal pan or template into which the quarter sawed white oak and other plies are arranged prior to bending, the quarter sawed white oak ply being arranged with its grain in the direction in which the plies are to be bent, said pan or template having ends which abut against the ends of the plies so as to prevent the elongation of said plies as they are bent about the mandrel. This holds the tension side of the white oak lamination against being elongated and therefore prevents the raising of the grain which would create imperfect adhesion between the oak and the adjacent ply.

Another object of the invention relates to the method of making plywood receptacles.

Other objects of the invention will appear as the following description of a preferred and practical embodiment thereof proceeds.

In the drawings which accompany and form a part of the following specification and throughout the several figures of which the same characters of reference have been designated to indicate identical parts:

Figure 1 illustrates in separated but superposed relation three relatively stiff plies of wood to be employed in the manufacture of a vessel according to the present invention;

Figure 2 is a perspective view of apparatus employed to bend the ununited plies about a mandrel and to fuse them together with a thermosetting cement by heat and pressure;

Figure 3 is a front elevation of the apparatus shown in Figure 2 with the plywood bent substantially around the mandrel through the weight of the overlying die members;

Figure 4 is a view similar to Figure 3, the plywood laminations being in clamped relation to the mandrel;

Figure 5 is a perspective view of the cylindrical jig employed to assist in forming the scarf joint;

Figure 6 is an end view of the jig shown in Figure 5 illustrating the formation of the scarfed surfaces of the joint;

Figure 7 is a perspective view of the scarf joint illustrating physical characteristics of the faces of the joint;

Figure 8 is a perspective view of the joint welding apparatus;

Figure 9 is a cross section through a vessel illustrating the joined cylindrical side walls structure;

Figure 10 illustrates the method and apparatus for forcing a head into the cylindrical plywood structure;

Figure 11 is a plan view of apparatus for compressing the peripheral portion of the plywood side wall against the concave edge of the head, crushing the edges of the concave channel surrounding the head and applying the heat necessary to bring about the instantaneous fusion of the thermosetting cement;

Figure 12 is a longitudinal section through a portion of a vessel made according to the principles of the invention and through the apparatus illustrated in Fig. 11;

Figure 13 is a longitudinal diametrical section through a completed barrel;

Figure 14 is a plan view from the outside of a bung especially designed for the plywood construction;

Figure 15 is a cross section taken along the line 15—15 of Figure 14;

Figure 15A is a horizontal section taken along the line 15A—15A of Figure 14;

Figure 16 is a perspective view illustrating the preliminary laying and taping of the quarter sawed white oak sections forming the inner lamination of the "bourbon" barrel;

Figure 17 is a view showing the straight and bent positions of the plies of the "bourbon" barrel held against elongation in a flexible metallic pan or template;

Figure 18 is a longitudinal section through a barrel constructed with the sectional inner white oak lamination; and Figure 19 is a diagrammatic view in elevation illustrating power applied to the clamping dies for bending the plies about the mandrel prior to the application of the lateral clamping pressure.

Referring now in detail to the several figures, the reference characters 1, 2 and 3 represent a plurality of layers of wood in position to be brought together as a preliminary step in the manufacture of my novel plywood vessel. The number of plies is immaterial to the invention. There must, of course, be a minimum of two and as a rule three are adequate for most industrial and other purposes, but there is nothing in the teaching of the invention to limit it as to the number of plies to be employed excepting that it is to be distinctly understood that the plies or at least some of them are of such substantial thickness as to be bent only through the exercise of force and are not of such thin gage as to be amenable to being wrapped about a mandrel as though they were paper or cardboard.

The present invention has in contemplation sturdy plywood vessels to take the place of conduits or barrels of conventional construction as now employed for many or all industrial purposes and the invention is therefore directed particularly to the use of relatively thick plies since the natural grain strength of the wood in such plies remains unimpaired, whereas in plies which are sliced to such thinness that they bend limply under their own weight, the grain texture and consequently the powerful grain resistance to tensile strains has been substantially destroyed.

Merely by way of example, it may be stated that the outer layer or ply 1 which is to function as a reinforcing hoop continues over the entire length of the vessel from one end to the other may be one-eighth inch thick, the inner ply one-sixteenth inch thick while the middle ply may be one-sixteenth inch thick, making an aggregate thickness of the three plies of one-quarter inch having, when the plies are united, about the same stiffness as the ordinary one-quarter inch plywood which is widely used for building purposes.

The layers 1 and 3 are preferably arranged with the grain extending in what will be the circumferential direction when the plies are bent. The intermediate ply 2 is arranged with its grain at right angles to the inner and outer plies. The adjacent surfaces of the several plies have been treated with a Bakelite cement or its equivalent. The Bakelite cement is a water-proof agent which may come in several forms, but in the case of the present invention insofar as it has been worked out, it is preferred to use it in the form of a paint which is applied to the surfaces of the several plies either by brush or spraying. It hardens rapidly, will reliquefy at 300° F. and again hardens very rapidly, almost instantly. After this reliquefaction under heat it cannot again be reliquefied by heat, nor dissolved by water, steam or chemicals. Its bonding strength depends entirely upon the amount of pressure prevailing at the instant of liquefaction. These characteristics are common to all wood-bonding agencies which may be considered as absolutely water-proof, that is, thermosetting at high temperature and high pressure. For best results, the pressure should be all that the wood will withstand without rupture. The instant after the liquefaction of the bonding agent has taken place, the wood may be removed from between the heat and pressure applying instrumentalities. No cooling of the glue line is required for the efficacy of the joint. A glue or cement containing water is inadapted to the manufacture of the plywood vessel of the present invention inasmuch as the surfaces of the plies absorb the moisture which causes the ply to become distorted, to warp and twist and swell. Furthermore, it is practically impossible to evaporate all the water prior to the application of heat and pressure so that steam pockets are formed between the plies causing blisters and weak spots.

The Bakelite cement or its equivalent having been painted or otherwise applied to the contiguous surfaces of the several plies, is permitted to dry thoroughly before the plies are placed together so that they are entirely independent and capable of individual sliding movement throughout the act of bending. This is quite essential for as stated in the objects of the invention, if the plies were first united, the force required to bend the aggregate thickness of the plies would be enormous, which force would be concentrated at the joint tending to weaken the joint and cause it to pull apart. The joint would always be the weak link in the circumference of the side wall under such circumstances. The cylindrical shell would never be in a condition of repose, but always under internal stress tending to straighten out and this stress would be largely carried by the glue line, tending to cause separation or rupture at the glue line should any portion of the side wall of the vessel be subjected to undue violence or abuse in the course of use.

The bending apparatus shown in Figure 2, includes a hollow cylindrical mandrel 4 rigidly mounted in a horizontal position upon a frame 5 which carries horizontal rods 6 and 7 slidable through guides in fixed standards 8 and 9. Springs 10 and 11 surround the rods 6 and 7 at one side of the mandrel 4 between the standard on that side of the frame, the function of said springs being to normally position said mandrel in a central repose position. The mandrel can yield to pressure on one side, against the tension of the springs 11 and 10.

The mandrel 4 when in middle position is in spaced relation between the fixed resistance head 12 and the movable hydraulic ram head 13 of a hydraulic press. A weighty bending member 14 is suspended above the mandrel 4, said bending member consisting of hinged sections 15 and 16 with inner cylindrical concave faces of somewhat less than semi-cylindrical extent adapted to surround the mandrel when in their fully closed position in the manner illustrated in Figure 4. The sections 15 and 16 are provided with concave curvilinear rabbets 17 and 18 along the inner edges of their faces which are adjacent the hinge joint, which rabbets match, when the hinge joint is fully closed forming a semi-oval channel. A filler piece 19 of corresponding cross sectional shape seats in said channel breaking the joint at the hinge and preventing the outer ply being extruded or pinched in the hinge joint. For reasons which will later be explained, the hinges are of the expanding type consisting of the links 20 and 21 which can assume a divergent position illustrated in Figure 3 in which the hinge joint is spread apart and can also assume the acute position shown in Figure 4 in which the hinge joint is closed. At lateral and preferably vertically median points the sections 15 and 16 of the bending member are provided with conical centering depressions 22 and 23. These depressions are adapted to be entered by conical centering projections 24 and 25 formed on the movable ram head 13 and the resistance head 12. The surfaces of the sections 15 and 16 which will be contacted by the ram heads are preferably cylindrical and the surfaces of the ram heads correspondingly shaped so as to facilitate the centering movement of the sections 15 and 16 while being pressed together by the ram.

The bending member is suitably suspended above the mandrel with its hinge normally symmetrical with respect to the vertical axial plane of said mandrel and is capable of being let down upon an intervening set of wooden plies and by its sheer weight or by extraneously applied power, to bend said plies and to embrace them in bent position around the mandrel preparatory to the compressing action of the hydraulic ram.

With the movable and fixed heads 12 and 13 of the hydraulic ram in wide open position, the bending member 14 raised and the mandrel 4 in its central position, the plies 1, 2 and 3 congruently arranged and with their dry Bakelite cement coated faces in contact are placed upon the top of the mandrel, evenly divided by the vertical actual plane of the mandrel. The filler piece 19 is put in position along the middle line. The bending member 14 is then lowered until it rests upon the stack of plies. The weight of the outer portions of the bending member will bend the set of plies downward and as they assume a somewhat steeply inclined position, the sections 15 and 16 will slide down the inclined sides of the plies, opening the hinge joint causing the links 20 and 21 to assume the bridging relation illustrated in Figure 3. The sections 15 and 16 will continue to bend the set of plies until a position somewhat like that illustrated in Figure 3 is reached in which the plies are bent almost into the cylindrical shape of the mandrel and the sections 15 and 16 by reason of the spreading of the hinge joint are in lateral positions substantially symmetrical with respect to the axis of the ram heads so that when the ram pressure is applied it will be distributed uniformly throughout the circumferential extent of the bent wood laminations.

Some groups of plies will be stiffer than others, depending on the thickness of the plies and the nature of the wood from which they are made so that the weighty sections 15 and 16 will not always bend the stack of plies to the same extent. Ordinarily however the weight of the sections 15 and 16 is so related to the resistance of the stack of plies that the conical depressions 22 and 23 will always be within the range of the projections 24 and 25 on the ram heads. When the parts are in the position shown in Figure 3, the hydraulic ram head 13 is operated which advances in a rightward direction until the projection 24 enters the depression 22 after which the hydraulic ram pushes the entire mandrel, frame 5, and rods 6 and 7 in the rightward direction against the tension of the springs 10 and 11 until the section 16 of the bending member has made contact with the resistance head 12 of the ram and the projection 25 on said resistance head has entered the depression 23. This brings the mandrel and the parts which are riding upon it into a stationary position, and further movement of the hydraulic ram tends to compress the plies into intimate relation with the surface of the mandrel and with one another and to supply the pressure which is essential to give strength to the bond afforded by the thermosetting Bakelite cement.

In compressing the plies together, it will be understood from a comparison of Figures 3 and 4, that the sections 15 and 16 again come together at the hinge joint so that the filler piece 19 fits tightly the channel formed by the concave rabbets on the cheeks of the opposite hinge faces, and that the free ends of the plies and the sections 15 and 16 are brought close together as shown in Figure 4. It will be observed however that under maximum pressure some slight space is still left between the confronting ends of the plies and between the sections of the bending member. Although the plies may have coincident end edges when they are set upon the mandrel, their ends will have a stepped relation after they are bent around the mandrel, the same being due of course to the fact that the ply closest to the mandrel circumscribes a smaller circle than the more outlying plies. Had the plies been united before the beginning of the bending operation, this stepped rearrangement of the plies could not have taken place. Their end edges would still have been coincident and an enormous strain would have been set up tending to pull the vessel apart at the joint.

With the plies in the position shown in Figure 4, it only becomes necessary to get a temperature as high as 300° F. through the wood to the glue lines. A perforated gas burner 26 is provided which imparts the necessary heat to the glue lines through the shell of the mandrel. Other heating means may be, of course, considered the equivalent of that here shown and if desired the heating means might be in the sections 15 and 16 or in both the mandrel and the sections 15 and 16. When the temperature of 300° F. has penetrated the lines as far as the glue lines and while the bent plies are kept under pressure of the hydraulic ram, the Bakelite cement flashes into a liquid state and then immediately into a solid state, this being its permanent subsequent condition. The heat may then be discontinued, the hydraulic ram released and the split cylindrical shell removed from the mandrel.

The circumference of the mandrel 4 was preferably selected so as to produce a slightly oversize ply-wood shell in order to permit the free ends of the shell to be overlapped in the manner shown in Figure 6 to provide for the accurate cutting of the scarf joint. The scarfing jig may be in the nature of a portable tool in the case of small or average sized objects or if preferred, it may be a fixed machine. It is here shown as a portable tool consisting of an inner sturdy metallic cylinder 27 having an inclined slot 28 extending therethrough, and lengthwise thereof through an extent equal to and preferably exceeding the length of the vessel for which the scarfing jig is adapted. This slot is for the guidance of a cutting tool. There is an outer and preferably light and flexible sleeve 29 adapted to embrace the cylinder 27 with enough space therebetween to receive the plywood shell. This outer sleeve is slightly less than a complete circle when in its fully compressed position leaving a longitudinal opening 30 which is in the region of the slot 28 so that the cutting tool passes through said opening. The flexible sleeve 29 has ears 31 and 32 to which the clampers 33 and 34 are pivotally connected. Said clampers have a common pivotal connection 35, and are provided with tightening means consisting of a hinge bolt 36 having a threaded portion which passes through an aperture in one of the clampers and receives a threaded hand wheel 37 which may be screwed up upon the bolt 36 to bring the ends of the clampers toward one another and to press the sleeve 29 intimately against the plywood shell with the ends of the shell overlapping as shown in Figure 6.

The cutting tool may be of any suitable character either straight or disc-saw and since it is not part of the invention, it is not shown. The broken line designated as 38 indicates the plane in which the cutting tool acts. In practice the slope of the scarf is preferably greater than that shown in the illustrations. Its length depends somewhat upon the desired strength of the joint. A slope of one to twenty gives such strength that the plywood shell will part at any other place in preference to that joint.

The surfaces of the scarf are treated by a tool or tools which scarifies them as well as producing grooves 39 extending lengthwise of the joint. The scarifications consist of roughening of the material, raising of the fiber, etc., while the grooves preferably constitute definite, although slight corrugations. The joint is to be set up with the thermosetting Bakelite cement. The object of the scarifications is to hold a sufficient quantity of the cement while the object of the grooves is twofold, both to hold the cement and to interlock with one another so as under pressure to prevent any slippage of the joint as well as to form a permanent mechanical interlock between the faces, in the finished joint.

Figure 8 shows the apparatus for setting the joint. As illustrated, it comprises a rigid upright 40 having a lower horizontal beam 41 on which is mounted a lower heating and pressing element 42. This is a member extending longitudinally of the joint to be made and of a length of at least equal to and preferably in excess of said joint incorporating in its structure essentials of an electric heater, although it is of course understood that the specific apparatus herein described is merely exemplary and that any type of heater might be used without transcending the scope of the invention. The upper surface of the heating and pressing element 42 has the same curvature as the inner cylindrical surface of the finished vessel and said surface is continuous with the cylindrical surface of a mandrel 43 which is welded to the opposite edges of the lower heating and pressing element. A clamping sleeve 44 and clampers 45 and 46, which clamping sleeve and clampers are essentially the same as those constituting the scarfing jig are removably arranged about the lower heating and pressing member and its associated sleeve 44. There is enough space between the mandrel 43 and sleeve 44 to receive the plywood shell and when the sleeve 44 is fully clamped up against said shell an open space is left at 47 immediately above the lower heating and pressing elements to receive an upper heating and pressing element 48. This last named pressing element has a concave face of the same curvature as the outer surface of the finished vessel and is of the same length and width as the lower heating and pressing element, and is carried by a beam 49 which is fixed perpendicularly to the end of a plunger rod 50 of a hydraulic cylinder 51 mounted on the upper horizontal beam 52 which is fixedly supported from the upright 40.

In operation, the sleeve 44 with the clampers 45 and 46 is removed from the lower heating and pressing element and the mandrel 43. The plywood cylinder with open joint, the faces of which have been scarified, grooved and coated with a film of the Bakelite thermosetting cement is now placed upon the mandrel 43 with the joint lying directly above the lower heating and pressing element 42. The upper heating and pressing element by means of the hydraulic plunger rod is lowered through the space 47 into contact with the upper face of the joint of the plywood cylinder and the requisite pressure is then applied. When the heat throughout the glue line reaches approximately 300° F. the cement liquefies, solidifies and the joint is complete. The parts of the apparatus may then be loosened and the plywood shell in its complete united cylindrical form removed. The cross section of this shell is illustrated by the reference character 53 in Figure 9, showing the completed joint 54.

In the stage which the article has reached in the form shown in Figure 9, it is useful as a conduit or any other headless tubular construction having great tensile strength and able to sustain hydraulic or pneumatic pressures of high values.

Figures 10 to 13 show a further stage in the manufacture of the plywood vessel in which it is provided with one or both heads. The head 55 may be of a compound wood, plywood, or a single layer of wood. It is however made slightly larger in circumference than the inner circumference of the shell 53, for example, it may be formed one-sixteenth inch to one-eighth inch larger and it is forced in by hydraulic pressure represented by the plunger 56 and the cylinder 57. The extreme tensile strength of the material of the plywood cylinder particularly the outer lamination thereof together with the strength of the joint, enables this larger head to be forced into the smaller hole of the cylinder without the risk of rupturing either the wood of the cylinder or the joint. The head 55 is provided with a concave peripheral channel 58, having substantially sharp terminal edges 59 and 60. The concave channel is for the purpose of receiving Bakelite cement and its concave shape prevents the cement from being wiped off when the head is forced into the cylindrical shell. After the head 55 has been forced into the shell, the cylinder and head are placed endwise in a shallow die generally designated by the reference characters 61 and in particular constituted by a divided clamping ring having a segment 62 anchored at 63 to a suitable support and having the complementary segment 64 pivotally connected at 65 to the segment 62. The joints between the segments 62 and 64 both on the hinged side and at the open side are broken by curved filler pieces 82 and 83 seated in correspondingly shaped recesses extending longitudinally along the edges of the joints the object of the filler pieces being to prevent pinching of the shell 53. The end of the segment 64 which approaches the anchored end of the segment 62 is connected to a pneumatically operated plunger 66. The die is rabbetted so as to receive the head and adjacent peripheral portion of the cylindrical shell 53 and the plunger operates to squeeze the die together against the cylindrical shell in the region of the head. The pressure is such that the peripheral edge of the cylindrical shell is compressed into the peripheral edge of the head crushing the thin sharp edges 59 and 60 of the channel so as to flatten the edge of the head in contact with the inner surface of the cylinder. While this pressure is still being applied, heat by way of a suitable element 67 is transmitted to the glue joint so as to fuse and immediately harden the cement making it a permanent joint between the head and cylindrical shell. The die 61 may then be immediately opened and the shell finished with the head or bottom being released. This head does not have to be secured by any other mechanical means, although of course the use of auxiliary fastenings does not affect the integrity of the invention. In view of the fact that the inner ply runs circumferentially, this vessel will hold liquids inasmuch as seepage channels through the wood run with the grain and not perpendicular to the grain and consequently will not appear on the outside of the joint between the head and side wall of the barrel.

Figure 13 shows the plywood barrel 53 having two heads 55 and 68 both inserted in the same manner. Ordinarily one head would be inserted at the factory where the barrel is produced and the other at the station where the barrel is filled.

Inasmuch as the plies of the shell 53 are arranged with the grain of the wood lying in different directions, it is impractical to employ the usual driven bung; consequently, I have devised a bung which is readily inserted or removed without in any way disrupting the structure of the shell and which will retain both liquid and gaseous pressure. For this purpose of this bung an oval hole 72 is made in the side wall of the barrel parallel to a radius of the vessel passing through the point of intersection of the axes of the oval. In other words the side walls of the opening are preferably of cylindrical and not frusto-conical curvature. The long axis of the oval opening extends in the longitudinal direction of the shell 53. The bung consists of an inner metal plate 69 whose width dimension is less than the long axis of the oval opening and whose length is longer than said long axis and whose curvature corresponds to that of the inner surface of the shell 53. A plate of these dimensions and curvature can slip endwise through the oval opening until it is inside of the vessel and then can be turned so that it closes the opening and seats in a true manner against the inner wall of the barrel. The inner plate 69 is preferably made oval of slightly greater size than the oval opening which it is to obstruct. It has a threaded aperture 70 at its middle. A rubber block 71 having the same shape, and normally a very slight smaller size than the oval hole is cemented to the plate 69 and has an aperture registering with the aperture 70, for the passage of a screw. The rubber block is somewhat thicker than the thickness of the plywood shell 53. An outer plate 73 which may be in shape and size similar to the inner plate lies freely against the outer face of the rubber block and has a central hole aligning with the aperture in the rubber. A screw 74 passes through the hole in the outer plate 73 of the aperture in the rubber block and screws into the threaded aperture 70 in the inner plate. It will be noted that the screw is longer than the aggregate passage through the several elements of the bung.

To install the bung, the screw 74 is backed out until it is almost but not quite released from the inner plate 69. This makes it possible to take hold of the protruding head of the screw as a handle and to separate the outer plate 73 from the rubber block 71, and to push the united elements 69 and 71 of the bung through the hole 72 with their smaller dimension in line with the larger dimension of the hole. By canting the bung slightly while thus inserting it, these united elements can be entirely pushed inside of the vessel. It can then be turned so as to bring the rubber block into fitting relation to the hole whereupon by pulling on the screw the rubber block can be brought through the hole with the inner plate 69 having its curved face in proper coincidence with the curved inner surface of the shell 53. The object of having the rubber block 71 cemented to the inner plate 69 is for the accomplishment of this purpose. The outer plate 73 is then turned with the fingers until its curvature coincides with that of the outer surface of the vessel and the screw is tightened up. The result of this tightening is to compress the rubber block 71 between the inner and outer plate which will reduce the thickness of the rubber and at the same time increase its lateral dimensions causing its peripheral margin to grip the wall of the hole 72 in a fluid-tight manner.

For releasing the bung, which will of course be done at a later period in the life of the vessel, the barrel is turned with the bung uppermost so as to avoid spilling of the contained liquid, the screw is loosened, the rubber block 71 returns to its normal shape in which it is a free fit in the bung hole and by turning the bung to an angle of 90° it may be pushed into the bung hole and then removed edgewise with its small dimension in the same direction as the long dimension of the bung hole. A spigot of any suitable character may then be inserted, or the contents poured or siphoned out as may be desired.

One of the most important adaptations of my invention is the manufacture of what is known by its function as a "bourbon" barrel used for storing whiskies and liquors during the ageing. Such a barrel is necessarily made of quarter sawed white oak, this being the only wood and the only form of said wood which will satisfactorily serve for the ageing and which will retain alcohol. It is necessary that the interior of these barrels be charred.

The process of manufacturing the plywood vessel as has been described, in most essentials lends itself to the manufacture of a plywood "bourbon" barrel. Inasmuch as it is a physical impossibility to produce quarter sawed wood by the usual method of rotary cutting of large sheets of veneer, it becomes necessary to employ narrower pieces of the quarter sawed wood. These may of course be actually sawed, sliced or rived and dressed or surfaced, the term "quarter sawed" being here used to indicate the fact that the face of the pieces are cut parallel to radial cuts of the log.

In carrying out the invention the inner ply is composed of relatively narrow pieces 75 of quarter sawed white oak, each piece being long enough to extend all the way around the barrel, a sufficient number of pieces being arranged side by side to equal the entire length of the barrel. These pieces are united to form a single sheet or ply at the same time the several independent plies are fused into one at the end of the bending step. Each piece is therefore prepared with a bevelled face 76 so that when the pieces are arranged side by side as indicated in Figure 16, their bevel faces will all be in contact. The bevelled faces are coated with the thermosetting Bakelite cement which is permitted to dry before the pieces are brought together. The pieces are temporarily held together by the employment of strips of adhesive tape 77.

Since the innermost ply of the "bourbon" barrel will be charred, it is hardly practical to cut the quarter sawed white oak less than a quarter inch thick, making a ply that is quite difficult to bend. It is a characteristic of quarter sawed white oak that when bent the surface grain on that side which is subjected to tension will rupture and stand up, causing roughness which might prevent a good bond being formed between this and the adjacent ply; also the breaking of the grain reduces the tensile strength of the ply. The present invention therefore contemplates bending the oak without permitting the elongation of the convex side thereby avoiding the breaking of the grain. This is done by the use of the flexible metal pan 78. Said pan is capable of bending around the mandrel 4. It is formed with right angular ends 79 and 80 with inturned flanges 81. The several plies of wood which are to make up the cylindrical side wall of the bourbon barrel are cut of such length that they make a close fit between the ends 79 and 80. After having been coated with the Bakelite cement and the Bakelite permitted to dry in the manner described in connection with the stack of plies shown in Figure 1, they are pushed into the pan 78. The latter is then placed upon the mandrel in the usual manner, the bending member brought down against it so that both the pan and the enclosed plies are bent around the mandrel. Since the oak ply on account of its thickness and the hard character of the wood may resist bending to such an extent that the mere weight of the bending member will not suffice and hydraulic or other power means such as the plungers 82 and 83, see Figure 19, may be employed for forcing the bending member to bend the pan with its plies around the mandrel. It will be observed from Figure 17 that the thick oak plies 75 are lowermost and therefore, while its upper surface cannot elongate, being confined within the pan 78, its lower surface is compressed by the condensation of its fibers in being forced to take the curvature of the mandrel.

At the proper moment of pressure, the temperature of the set of plies is raised to the point at which the Bakelite cement fuses not only in the surfaces between the plies but simultaneously in the surfaces of the joints of the narrow strips which constitute the ply 75. It might be queried whether the thickness of the oak ply 75 would not prevent high temperature from being transmitted through the mandrel to the glue lines. This problem finds its own solution, for since the inside of the bourbon barrel must be charred any way, I substitute for an indirect heating element, an open oil or gas flame which plays upon the inner surface of the mandrel raising the mandrel to the charring temperature of the inner surface of the oak ply which assures an ample transmission of heat to the glue lines. Thus the uniting of the narrow pieces which constitute the oak ply, the fusing of the several plies, and the charring of the barrel are all accomplished in a single act. Furthermore, the adhesive tape which temporarily held the narrow pieces in position is destroyed in the charring and all vestiges of it disappear.

The other steps in the manufacture of the bourbon barrel follow the steps of manufacture of the plywood barrel described in connection with Figures 1 to 12, inclusive.

While I have in general described the process of my invention as it would be done in a single factory it is obvious that different parts of the process might be performed in different locations. For example, for purpose of economy in shipment the bending and fusing of the plies might be done in one factory, the longitudinal scarfed joints of the shells being left open. This would permit several open shells to be nested one within the other, the joints being sealed and the heads inserted at another place, for example, the point at which the vessels are filled.

It will be understood that the apparatus as illustrated is more or less idealistic in the nature of its disclosure and subject to such changes as the exigencies of use may indicate and that it is employed chiefly as illustrating a means by which the process of the invention may be carried out and the product of the invention produced without imposing any limit upon the scope of the invention either regarding the nature of the apparatus to be used or the process by which the invention is practiced.

What I claim is:

1. Method of making a curved sided plywood vessel comprising forming a plywood cylinder, forming a head for said cylinder having a concave peripheral groove terminating in relatively sharp edges, applying to the surface of said groove a cement which sets under pressure and high temperature, forcing said head into said cylinder, and applying crushing pressure to the outside periphery of said cylinder in the zone of said head for crushing the relatively sharp edges of said groove bringing the periphery of said head into surface contact with the adjacent wall of the cylinder, and applying heat to effect the thermosetting of said cement while the joint between said head and cylinder is still under pressure.

2. Method of making a curved sides plywood vessel comprising arranging in superposed relation a plurality of plies of wood, the outermost of which consists of a plurality of relatively narrow strips arranged with their length dimensions in the direction of the circumference of the vessel, temporarily securing said strips in contiguous side by side relation, certain faces of said plies and of said strips being coated with a dry film of a cement which sets under heat and pressure, said sheets and strips being arranged in such a way that at least one face of each pair of contacting faces has a cement film, placing said plurality of plies against a mandrel with the ply composed of the strips in contact with said mandrel, forcing the said superposed plies to conform to the shape of said mandrel, applying heat of charring intensity to the plies, transmitted through said mandrel, thereby carrying the heat to the "glue lines" between the plies and strips while they are held in compression against the mandrel, thereby setting the cement and forming a shell whose shape is substantially that of the mandrel, and simultaneously charring the inner surface of the ply made of strips.

3. Method of making a curved sided plywood vessel comprising arranging in superposed relation a plurality of plies of wood, the outermost of which consists of a plurality of relatively narrow strips arranged with their length dimensions in the direction of the circumference of the vessel, temporarily securing said strips in contiguous side by side relation, certain faces of said plies and of said strips being coated with a dry film of a cement which sets under heat and pressure, said sheets and strips being arranged in such a way that at least one face of each pair of contacting faces has a cement film, placing said plurality of plies against a mandrel with the ply composed of the strips in contact with said mandrel, forcing the said superposed plies to conform to the shape of said mandrel, at the same time inhibiting the elongation of the convex sides of the plies, and applying heat to the "glue lines" between said plies and said strips while they are held in compression against the mandrel, thus setting the cement and forming a shell whose repose shape is substantially that of the mandrel.

GEORGE C. HAMILTON.